(12) United States Patent
Liu

(10) Patent No.: US 7,341,265 B1
(45) Date of Patent: Mar. 11, 2008

(54) FRAME STRUCTURE FOR FOLDABLE BABY TRAILER

(76) Inventor: Cheh-Kang Liu, 5F., No. 41, Alley 3, Lane 91, Sec. 4, Pa Te Rd., Taipei (TW)

( * ) Notice: Subject to any disclaimer, the term of this patent is extended or adjusted under 35 U.S.C. 154(b) by 192 days.

(21) Appl. No.: 11/362,196

(22) Filed: Feb. 27, 2006

(51) Int. Cl.
*B62K 27/12* (2006.01)
(52) U.S. Cl. .................. 280/204; 280/292; 280/656
(58) Field of Classification Search ........... 280/204, 280/202, 292, 656, 646, 42, 647, 650, 657, 280/658, 639
See application file for complete search history.

(56) References Cited

U.S. PATENT DOCUMENTS

| | | | | |
|---|---|---|---|---|
| 211,828 | A | * | 2/1879 | Ash ........................... 280/35 |
| 3,907,325 | A | * | 9/1975 | Gaines et al. ............... 280/657 |
| 5,020,814 | A | * | 6/1991 | George et al. .............. 280/204 |
| 5,299,817 | A | * | 4/1994 | Chang ......................... 280/35 |
| 5,669,618 | A | * | 9/1997 | Chiu .......................... 280/204 |
| 5,687,980 | A | * | 11/1997 | Eckroth ..................... 280/204 |
| 6,053,518 | A | * | 4/2000 | Chiu .......................... 280/204 |
| 6,705,628 | B2 | * | 3/2004 | Kahmann .................. 280/204 |
| 6,896,275 | B1 | * | 5/2005 | Liu ............................ 280/204 |
| 6,959,938 | B1 | * | 11/2005 | Liu ............................ 280/204 |

* cited by examiner

*Primary Examiner*—Anne Marie Boehler
(74) *Attorney, Agent, or Firm*—Troxell Law Office, PLLC

(57) ABSTRACT

A frame structure for foldable baby trailer is disclosed to include a bottom frame formed of two side bars and a front bar and a rear bar, two vertical side frames each having two bottom frame bars respectively pivoted to the side bars and an arched top frame bar pivoted to the bottom frame bars, a transverse top bar detachably connected to the arched top frame bars of the two vertical side frames, a trailer bar pivoted to the front side of said side bar of the bottom frame and selectively locked between an extended position and a received position, and a bumper detachably connected between the side bars of the bottom frame.

4 Claims, 11 Drawing Sheets

FRAME STRUCTURE FOR FOLDABLE BABY TRAILER

BACKGROUND AND SUMMARY OF THE INVENTION

The present invention relates to a baby trailer and more specifically, to a foldable frame structure for foldable baby trailer.

U.S. Pat. No. 6,959,938B1 discloses a folding collapsible baby trailer, which allows the two vertical side frames and the trailer bar to be collapsed to reduce space occupation for storage or delivery. However, this structure of folding collapsible baby trailer still has drawbacks as follows:

1. When the vertical side frames are folded down and closely attached to the bottom frame, the collapsed vertical side frames with the bottom frame still occupy much storage space, and the bulky size of the collapsed folding collapsible baby trailer is inconvenient to carry by the user.

2. When a baby is sitting on the flexible seat, the gravity weight of the baby forces the flexible seat to curve downwards. During moving of the folding collapsible baby trailer on the road, the folding collapsible baby trailer has no means to protect the downwardly curved flexible seat from bumps, and the baby who sits on the flexible may be hurt accidentally.

3. When the folding collapsible baby trailer is collapsed and packed for exhibition in a distribution center, the protruding part of the packed folding collapsible baby trailer may huts people passing by accidentally.

The present invention has been accomplished to provide a jogging stroller, which eliminates the aforesaid drawbacks. According to one aspect of the present invention, the frame structure for foldable baby trailer comprises a bottom frame formed of two side bars and a front bar and a rear bar, two wheels pivotally supported on the side bars of the bottom frame, two vertical side frames each having two bottom frame bars respectively pivoted to the side bars and an arched top frame bar pivoted to the bottom frame bars, a transverse top bar detachably connected to the arched top frame bars of the two vertical side frames, and a trailer bar pivoted to the front side of said side bar of the bottom frame and selectively locked between an extended position and a received position.

According to another aspect of the present invention, a bumper is detachably connected between the side bars of the bottom frame to protect the foldable baby trailer from bumps.

DETAILED DESCRIPTION OF THE INVENTION

Figure 1:
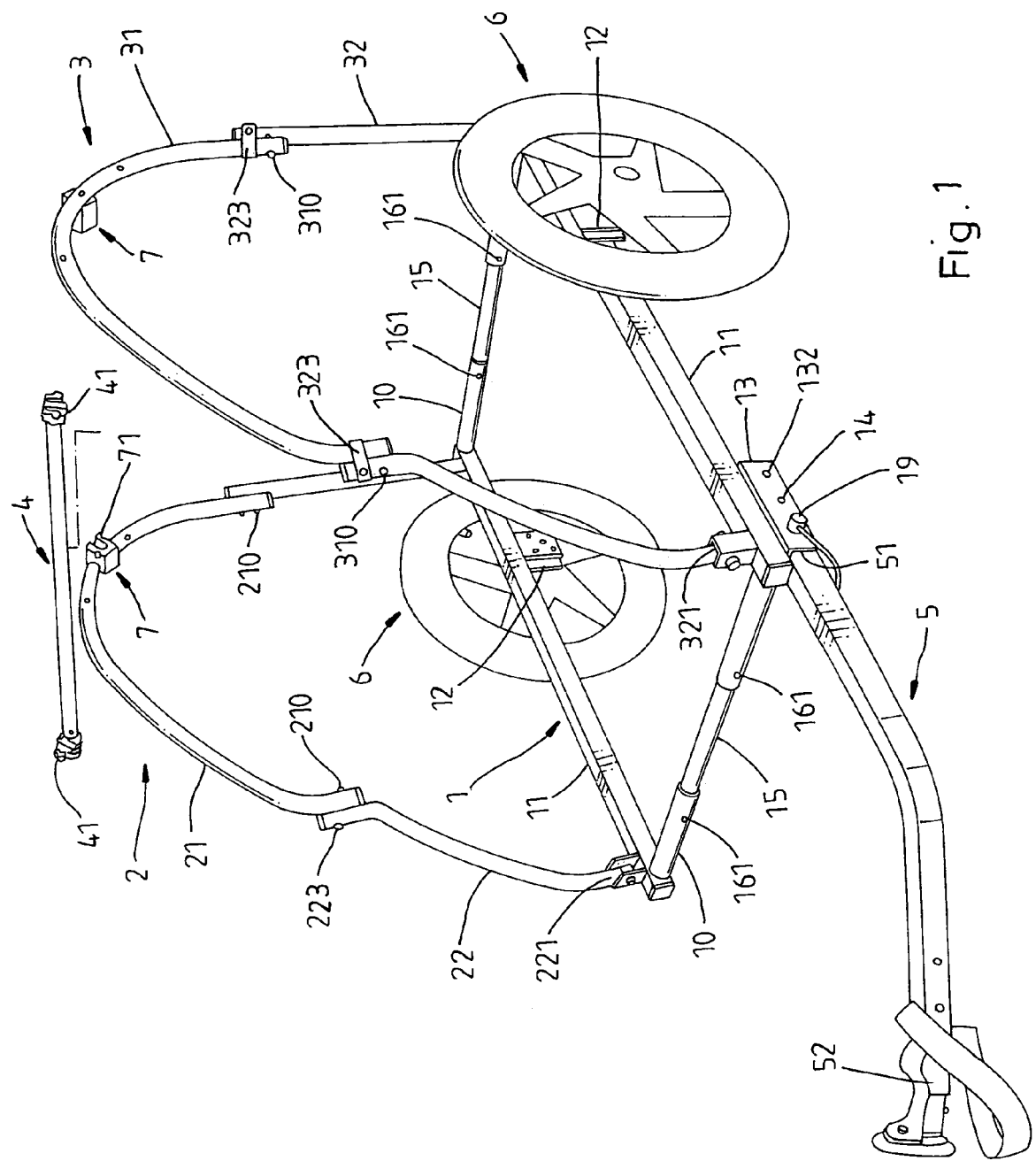
FIG. 1 is an exploded view of the frame structure of a foldable baby trailer according to the prior art.

Referring to FIGS. 1~8, a frame structure for foldable baby trailer is shown comprising a bottom frame 1, a first vertical side frame 2, a second vertical side frame 3, a transverse top bar 4, and a trailer bar 5.

The bottom frame 1 comprises two side bars 11 horizontally arranged in parallel at two sides, front and rear bars (see the reference sings 10 and 15) connected between the respective front and rear ends of the side bars 11, two wheel holder frames 12 respectively affixed to the side bars 11 to support a respective wheel 6, a channel-like lug 13 affixed to the bottom side of one side bar 11 near the front end and adapted to receive the trailer bar 5. The lug 13 has a pair of front locating holes (not shown) and a pair of rear locating holes 132.

The vertical side frames 2 and 3 have a substantially U-shaped profile. The two bottom ends 221 and 222, or 321 and 322 of each of the two vertical side frames 2 and 3 are respectively pivoted to the bottom frame 1 (see FIG. 8). Further, two lugs 7 are respectively fixedly provided at the vertical side frames 2 and 3 at the top. Each lug 7 has a locating groove 71 for receiving the transverse top bar 4.

The transverse top bar 4 has two springy hooks 41 respectively provided at the two ends and respectively detachably fastened to the locating grooves 71 of the lugs 7 at the vertical side frames 2 and 3.

The trailer bar 5 has one end, namely, the rear end 51 pivotally connected to the lug 13 at one side bar 11 of the bottom frame 1 by a pivot 14. The other end, namely, the front end 52 of the trailer bar 5 is connectable to a baby bicycle or tricycle (not shown). The trailer bar 5 is turned about the pivot 14 between the extended position (see Figures and 2) and the received position (see FIGS. 5~8). A lock pin 19 is selectively inserted into the front locating holes or rear locating holes 132 of the channel-like lug 13 to lock the trailer bar 5 to the bottom frame 1 in the extended or received position.

Figure 8:
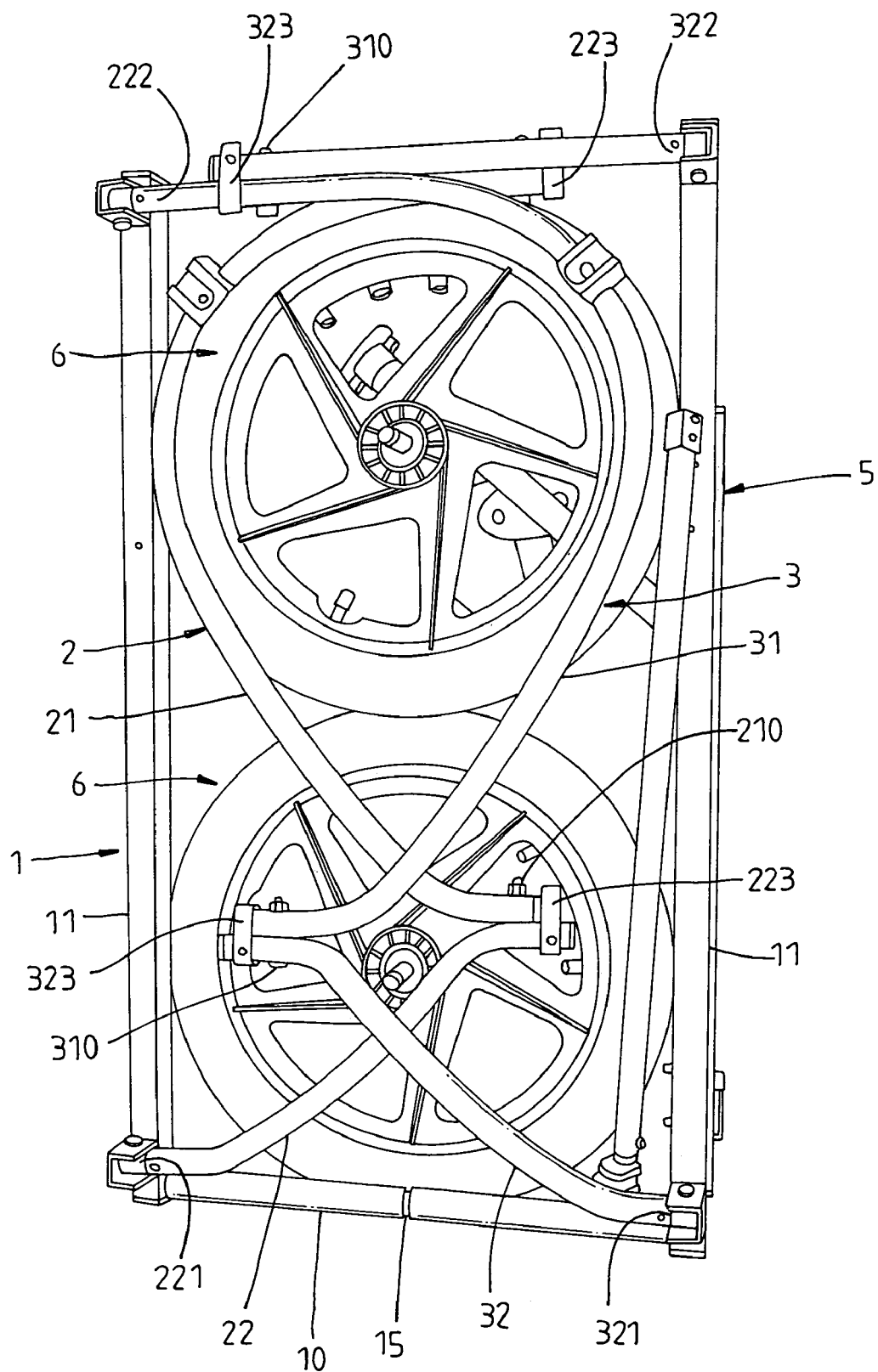
FIG. 8 is a top view showing the collapsed status of the foldable baby trailer.

When wishing to collapse the foldable baby trailer, disconnect the springy hooks 41 of the transverse top bar 4 from the lugs 7 at the vertical side frames 2 and 3 for enabling the transverse top bar 4 to be moved away from the vertical side frames 2 and 3, and then the vertical side frames 2 and 3 are respectively turned downwards and closely attached to the bottom frame 1, and then the lock pin 19 is disconnected from the channel-like lug 13 and the trailer bar 5, and then the trailer bar 5 is turned from the extended position to the received position and locked in the received position by the lock pin 19, and then the wheels 6 are respectively detached from the wheel holder frames 12 and put on the collapsed baby trailer for packing (see FIG. 8).

The main features of the present invention are outlined hereinafter. The vertical side frames 2 and 3 each are comprised of an arched top frame bar 21 or 31, and two bottom frame bars 22 or 32. The arched top frame bar 21 or 31 has the two distal ends respectively pivotally connected to the top ends of the bottom frame bars 22 or 32 with a respective pivot 210 or 310. The bottom frame bars 22 or 32 each have a stop plate 223 or 323 fixedly provided at the respective top end for stopping the associating arched top frame bar 21 or 31 to limit the turning angle of the associating arched frame bar 21 or 31 relative to the bottom frame bars 22 or 32, and a bottom end (namely, the aforesaid bottom end 221 or 222, or the bottom 321 or 322) pivoted to the bottom frame 1.

Figure 2:
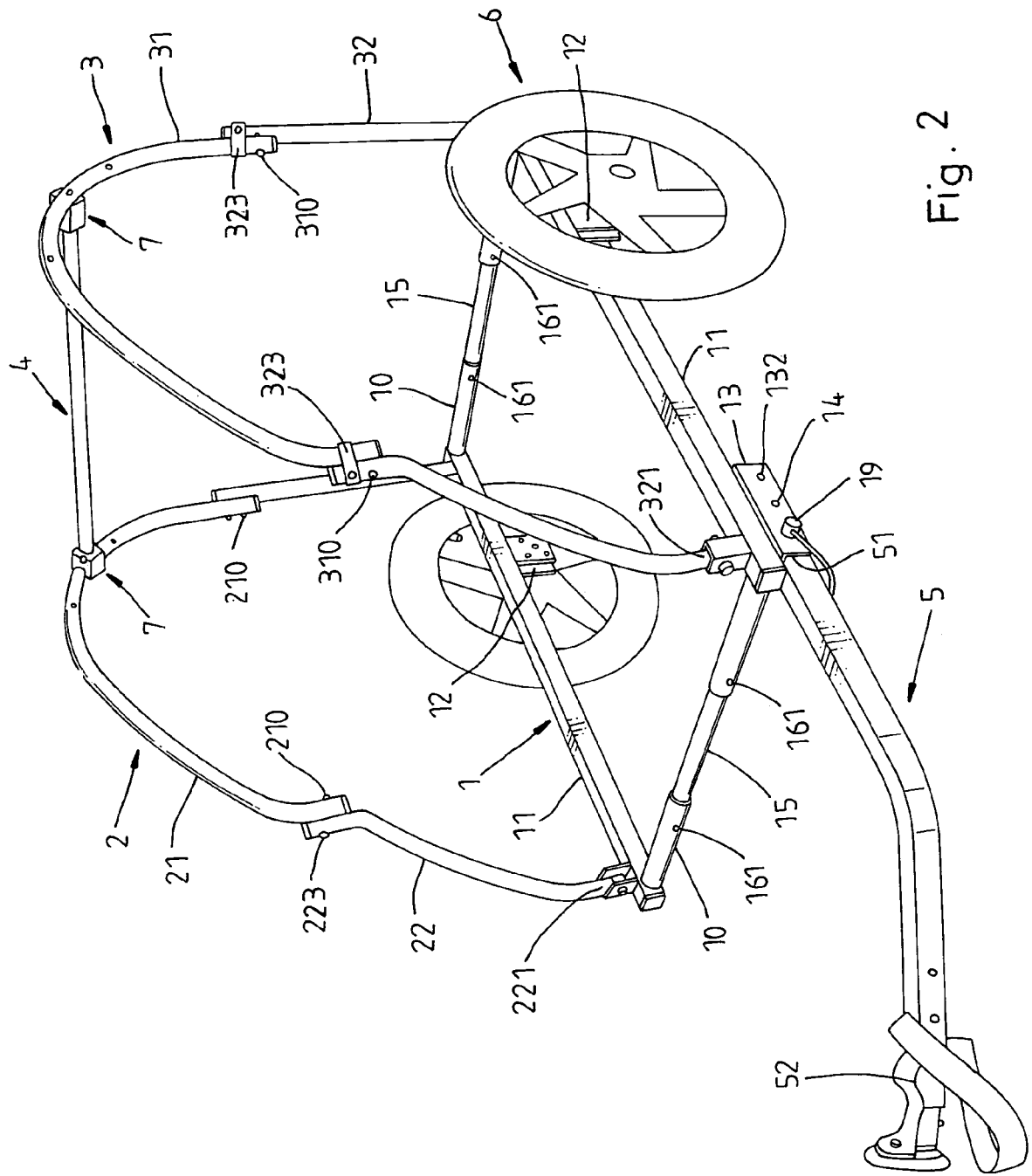
FIG. 2 is an assembly view of the frame structure of the foldable baby trailer according to the present invention.
Figure 3:
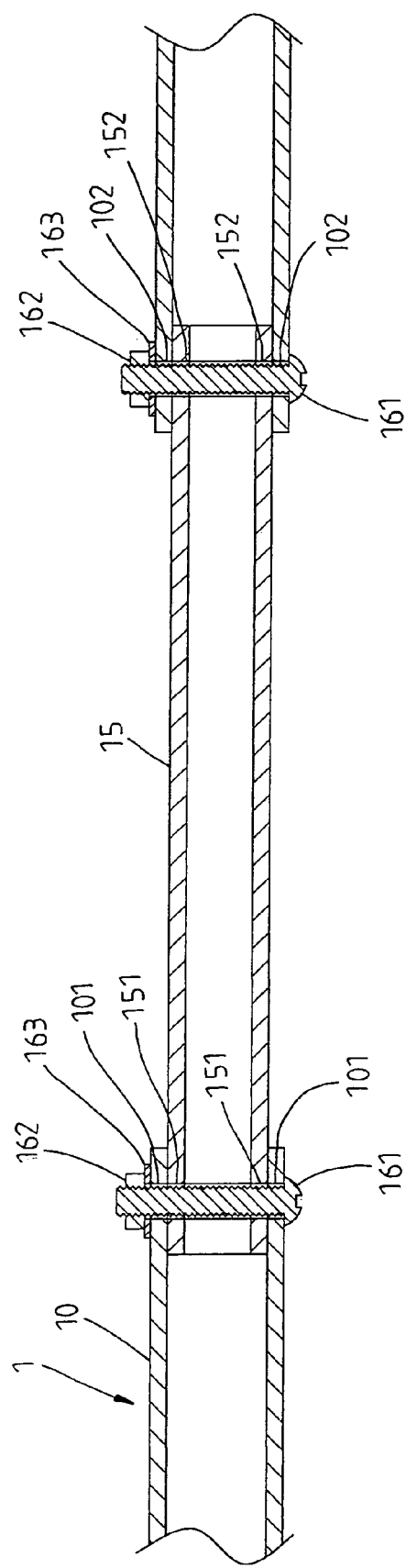
FIG. 3 is a sectional view of a part of the present invention, showing the structure of the front bar of the bottom frame.

Referring to FIGS. 1~3, the front and rear bars of the bottom frame 1 each are comprised of two sleeves 10 and a connecting tube 15. The two sleeves 10 are respectively and perpendicularly affixed to the side bars 11, each having two transverse locating holes 101 or 102 aligned at two sides. The connecting tube 15 has two ends respectively inserted into the sleeves 10, having two pairs of transverse locating holes 151 and 152 respectively aligned at the two ends corresponding to the transverse locating holes 101 and 102 of the sleeves 10. Two screws 161 are respectively inserted through the transverse locating holes 101 and 102 of the sleeves 10 and the transverse locating holes 151 and 152 of the connecting tubes 15 and screwed up with a respective nut 162 to lock the connecting tube 15 to the sleeves 10. Further, two washers 163 are respectively mounted on the screws 161 and stopped between the sleeves 10 and the associating nuts 162.

When collapsing the foldable baby trailer, the user can remove the screws 161 from the sleeves 10 and the connecting tube 15, and then move the sleeves 10 with the side bars 11 relative to the connecting tubes 15 to shorten the distance between the side bars 11, thereby reducing the space occupation of the bottom frame 1.

Figure 4:
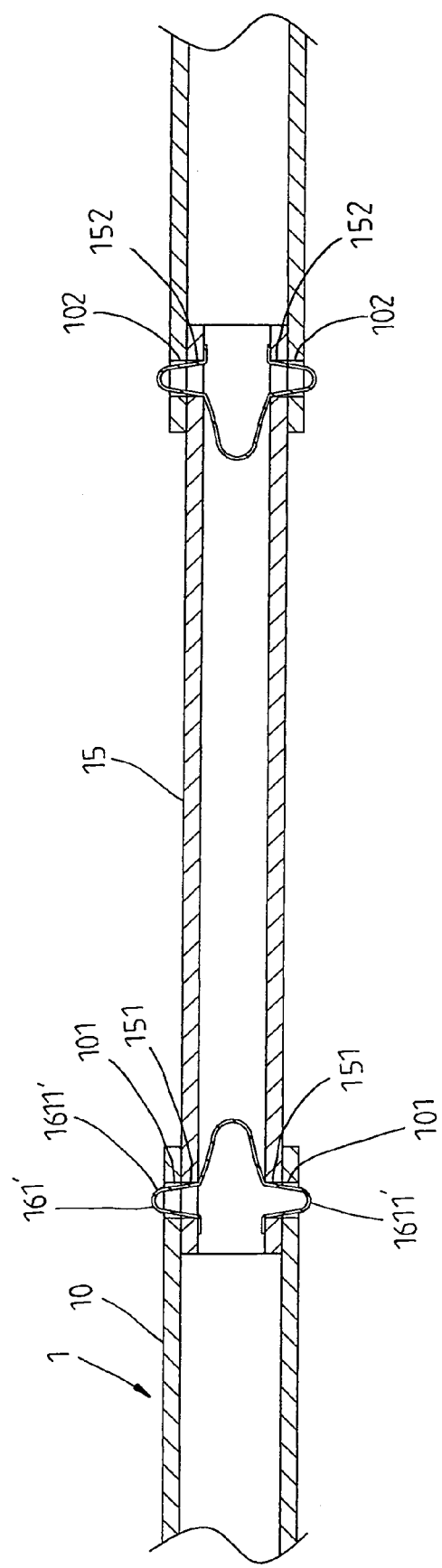
FIG. 4 corresponds to FIG. 3, showing an alternate form of the front bar with spring retainers.
Figure 5:
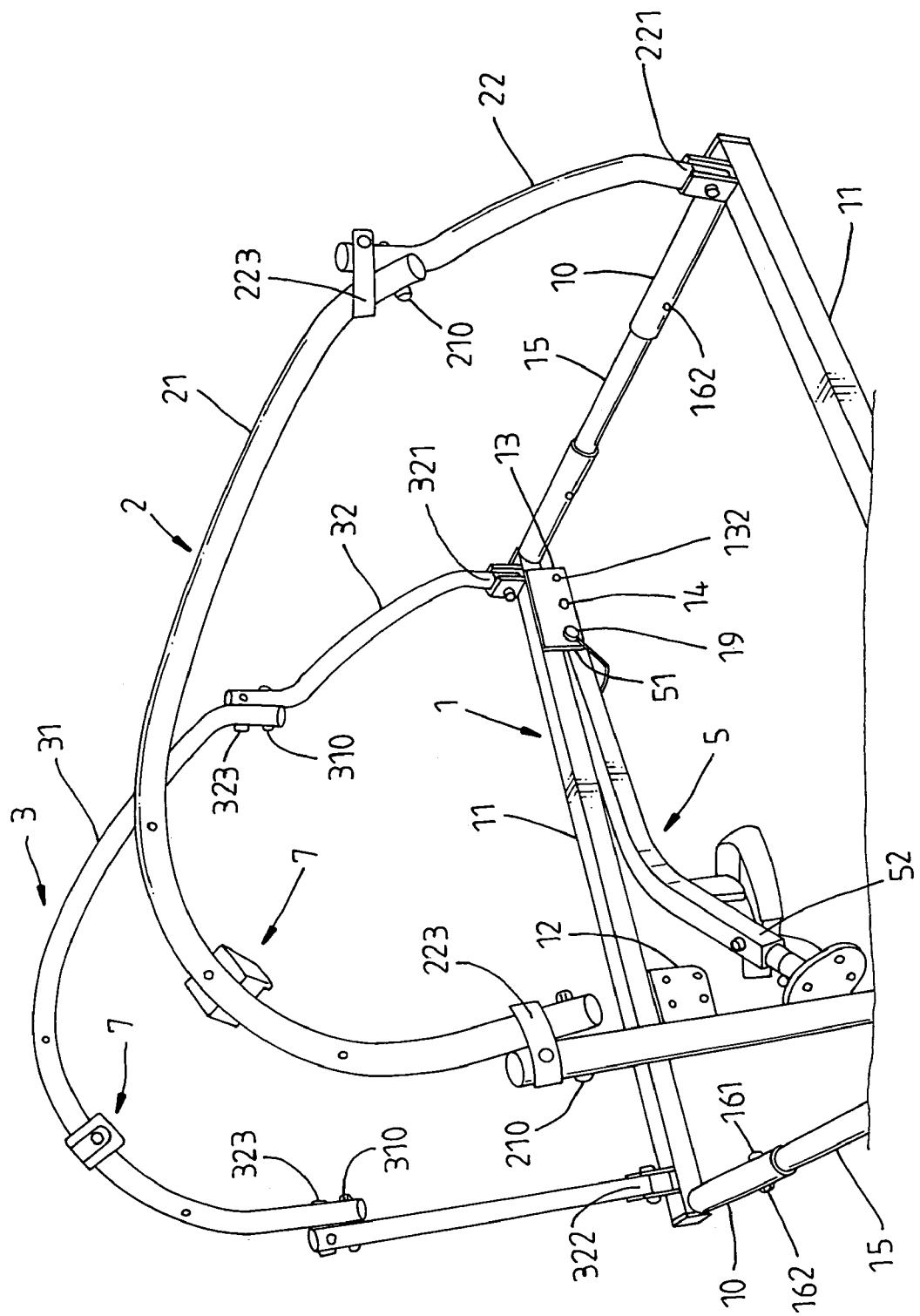
FIG. 5 is a schematic drawing showing the arched top frame bar of one vertical side frame turned downward according to the present invention.
Figure 6:
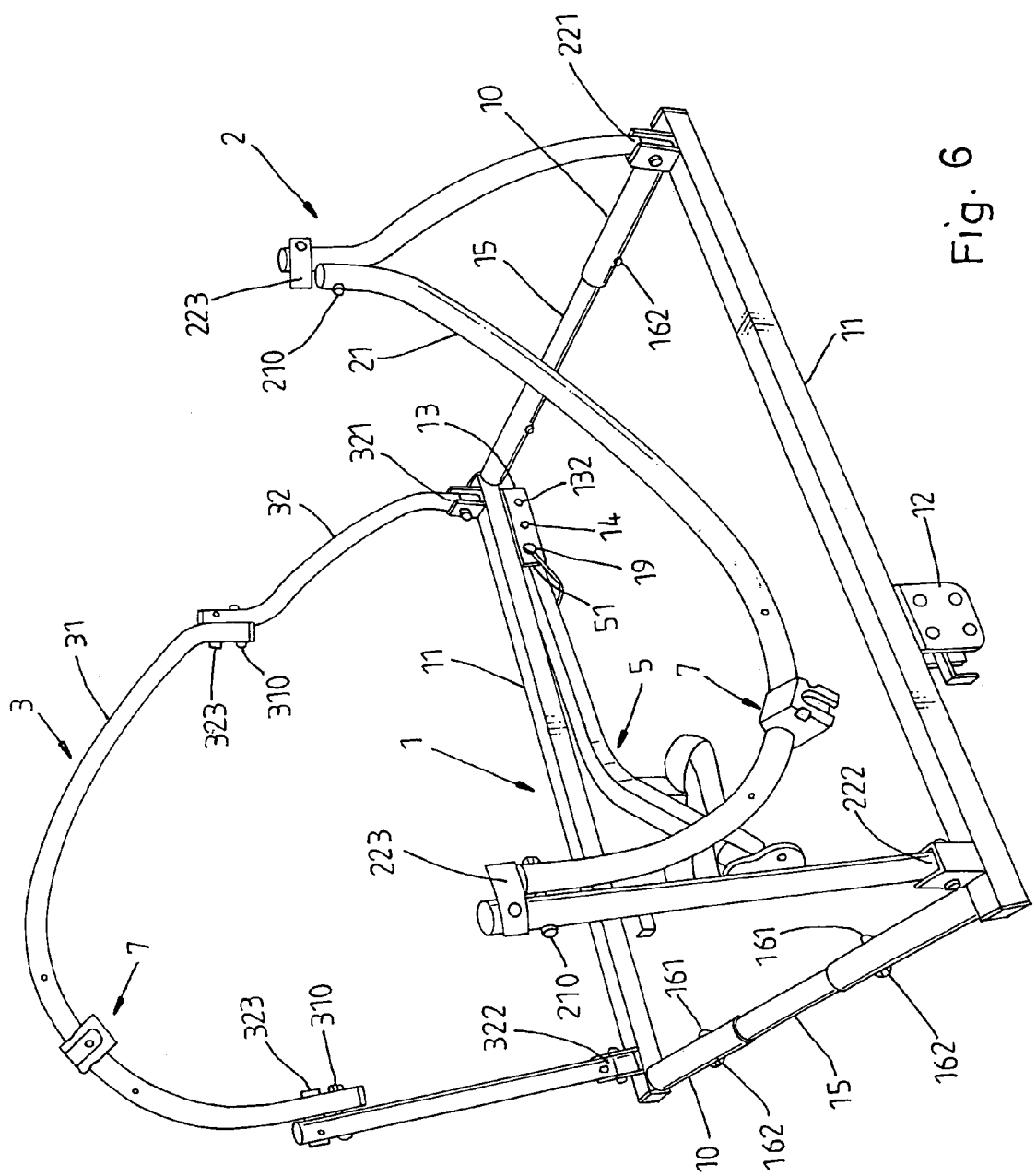
FIG. 6 corresponds to FIG. 5, showing the arched top frame bar turned to the bottom side.
Figure 7:
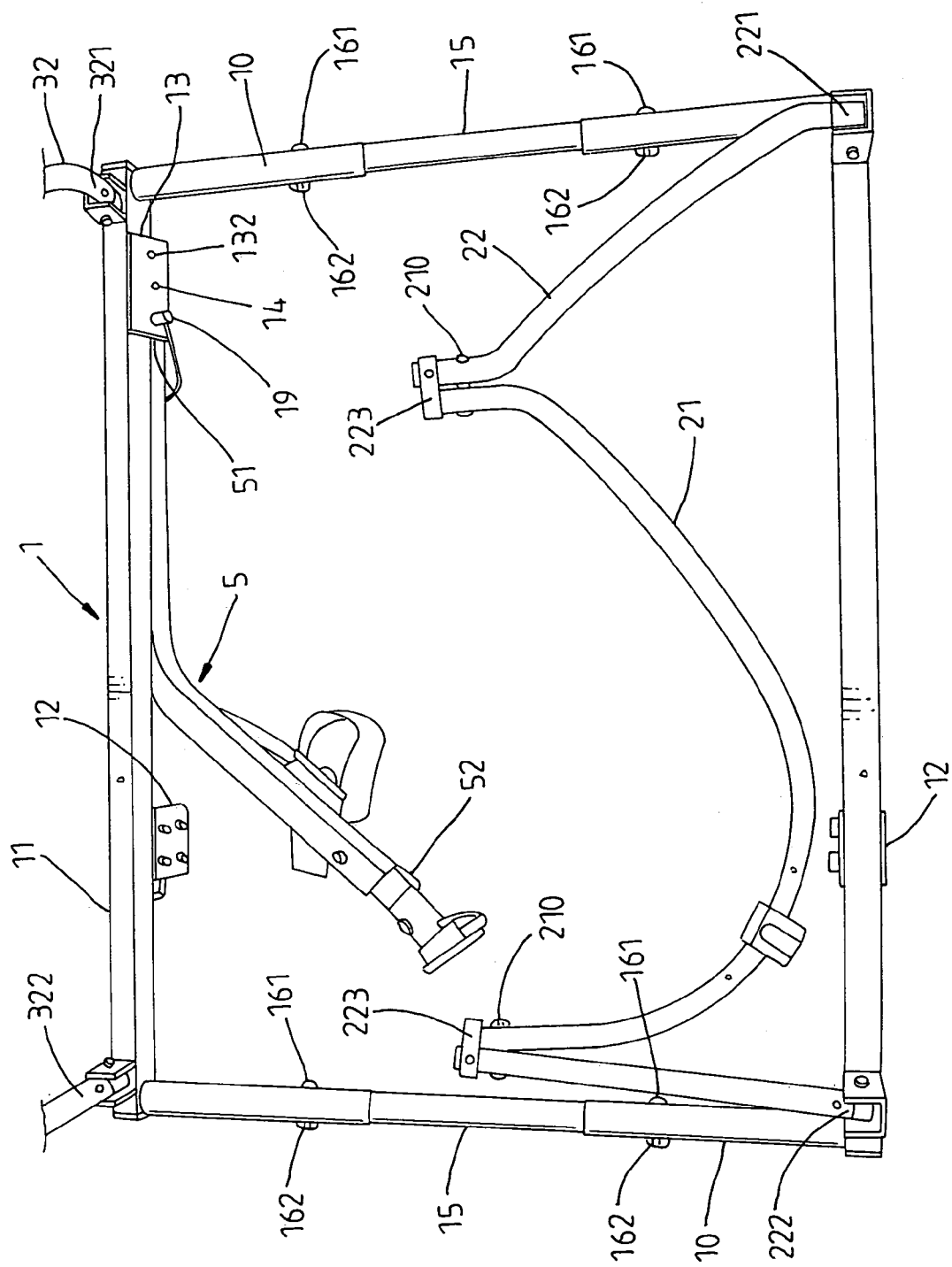
FIG. 7 corresponds to FIG. 6, showing one vertical side frame collapsed.

Referring to FIG. 4, two spring retainers 161' may be used and installed in the two ends of the connecting tube 15 to substitute for the aforesaid screws 161 and nuts 162 and washers 163 for locking the connecting tube 15 to the sleeves 10. The spring retainers 161' each have two protruding portions 1611' extending out of the transverse locating holes 151 or 152 for engaging into the transverse locating holes 101 or 102 of the associating sleeve 10. When pressed the protruding portions 1611' inwards, the sleeves 10 are unlocked and can be moved relative to the associating connecting tubes 15 to shorten the distance between the two side bars 11.

Figure 9:
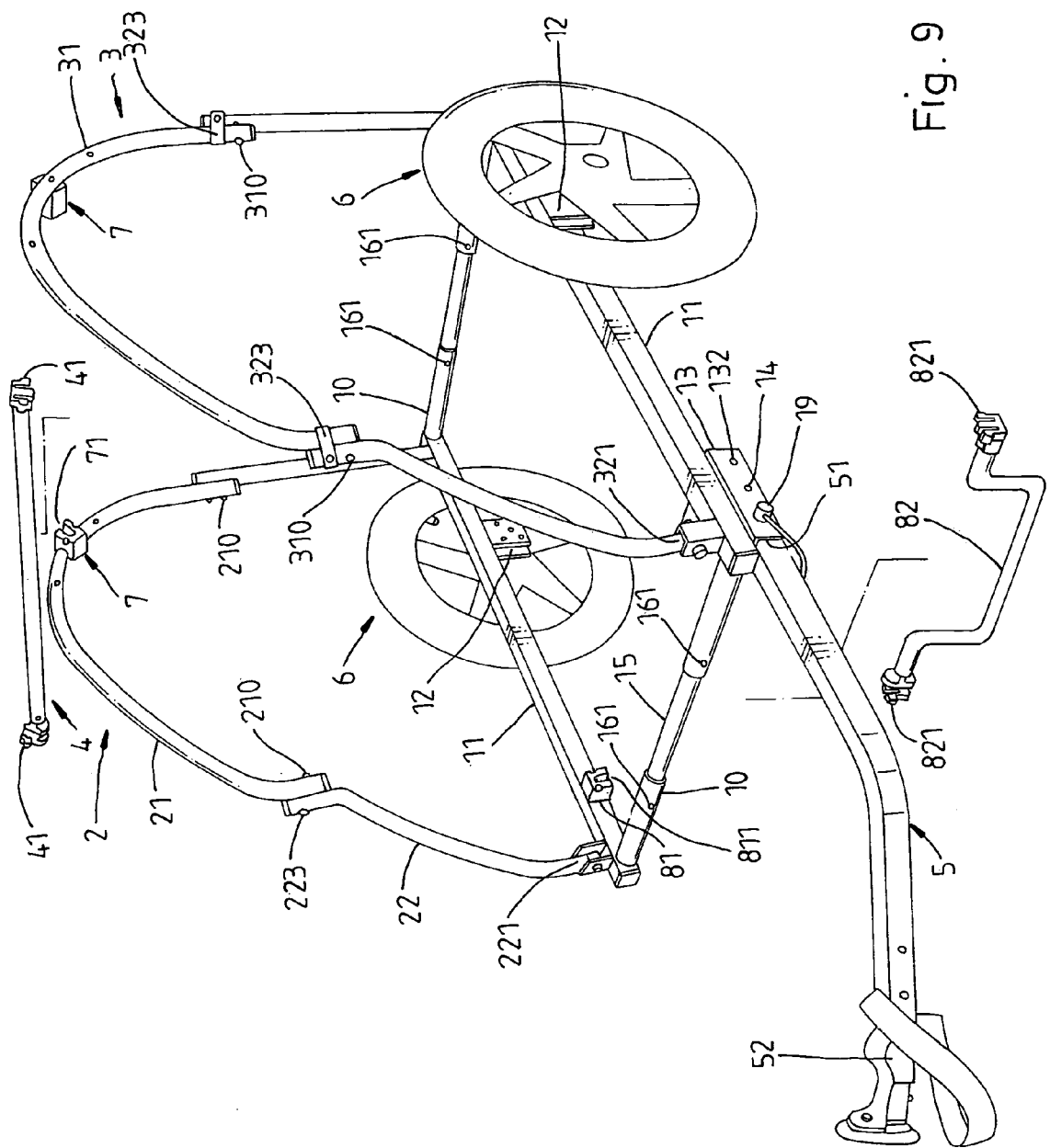
FIG. 9 is an exploded view of an alternate form of the foldable baby trailer according to the present invention.
Figure 10:
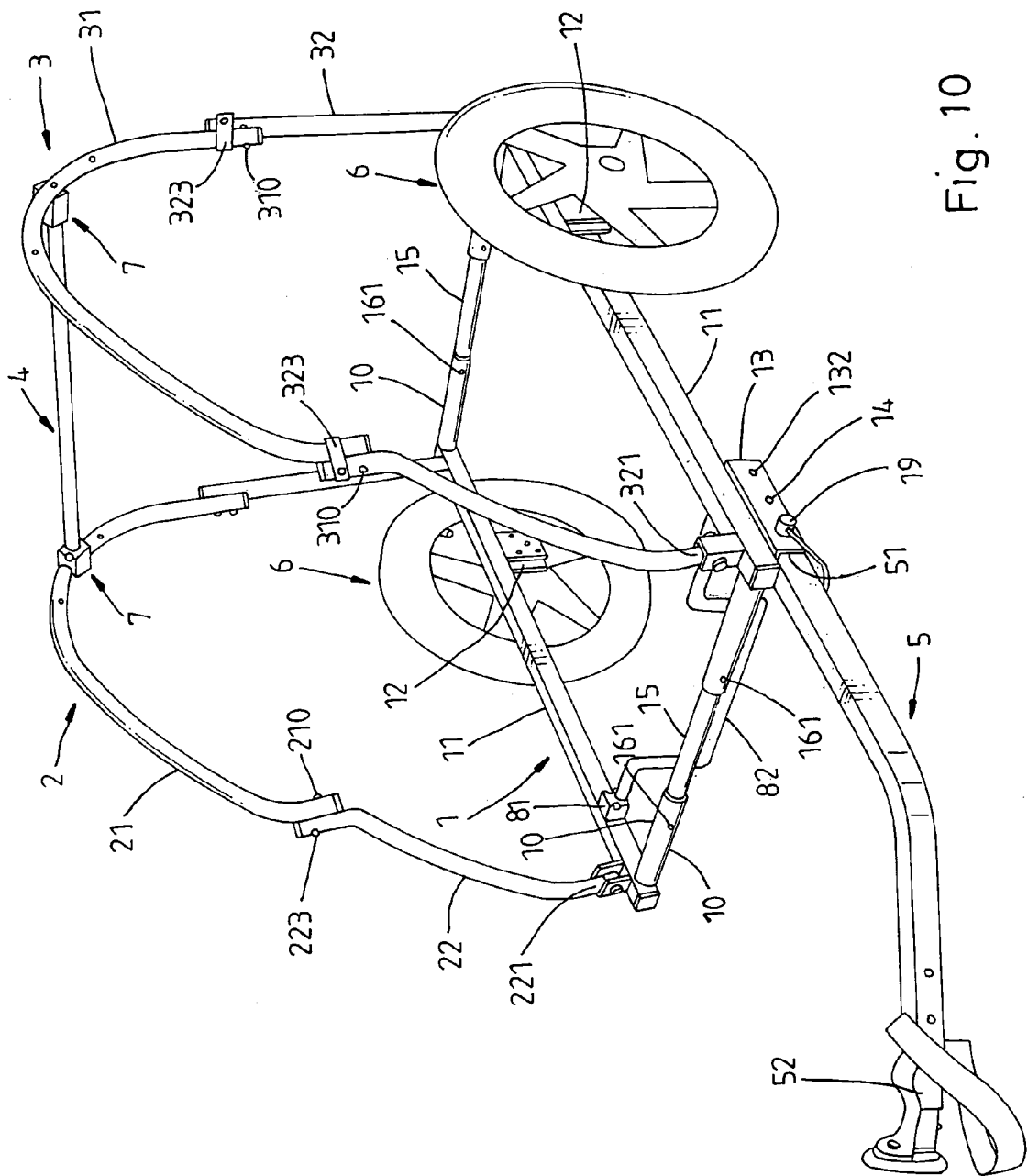
FIG. 10 is an assembly view of FIG. 9.
Figure 11:
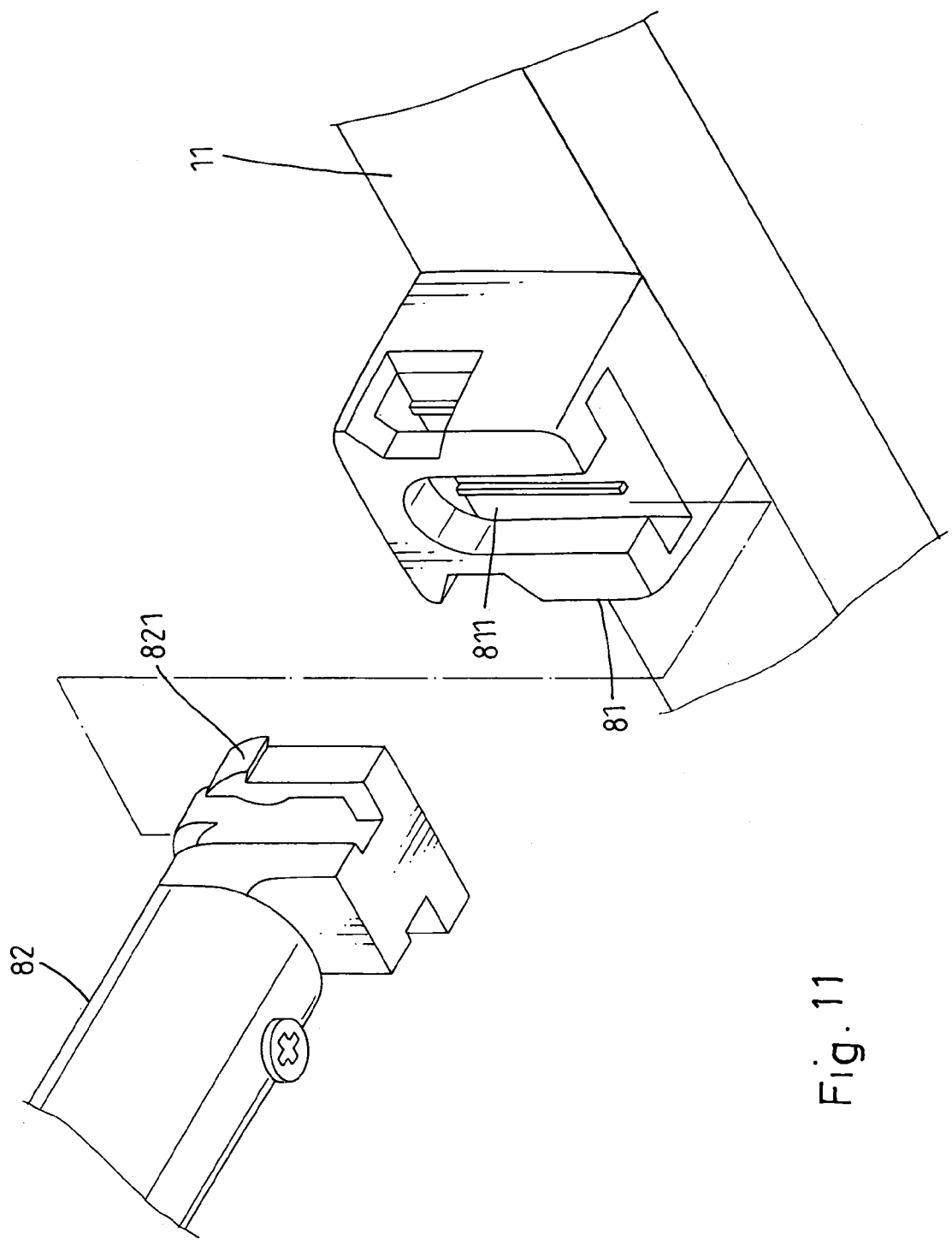
FIG. 11 is an exploded view of a part of the alternate form of the foldable baby trailer according to the present invention, showing the connection structure between the bumper and the side bar.

FIGS. 9~11 show an alternate form of the foldable baby trailer. This embodiment is substantially similar to the aforesaid first embodiment of the present invention with the exception of the added bumper 82, which is connected between the side bars 11 to protect the foldable baby trailer from bumps. The bumper 82 has two springy hooks 821 respectively provided at the two distal ends thereof and respectively hooked in the retaining holes 811 of the locating blocks 81 at the side bars 11.

As indicated above, the invention has the following advantages:

1. When collapsing the foldable baby trailer, the arched top frame bars 21 and 31 are turned downwards relative to the associating bottom frame bars 22 and 32, and then the arched top frame bars 21 and 31 are turned downwards with the associating bottom frame bars 22 and 32 and closely attached to the bottom frame 1. Further, the sleeves 10 can be moved with the associating side bars 11 relative to the connecting tubes 15 to shorten the distance between the side bars 11 when collapsing the foldable baby trailer. Therefore, the foldable baby trailer can be packed in a collapsed status to reduce the storage space for delivery, saving much transportation cost.

2. A bumper (or bumpers) 82 can be mounted on the base frame 1 to protect the foldable baby trailer from bumps.

3. When the foldable baby trailer is collapsed and packed in a distribution center for exhibition, the packed foldable baby trailer does not occupy much exhibition space and has not protruding part projecting out of the border area, assuring a high safety.

What is claimed is:

1. A frame structure for foldable baby trailer comprising:
   a bottom frame, said bottom frame comprising two side bars horizontally arranged in parallel at two sides, a front bar and a rear bar connected between respective front and rear ends of said side bars, two wheel holder frames respectively affixed to said side bars to support a respective wheel, and a channel shaped lug affixed to the front end of one of said side bars at a bottom side, said channel shaped lug having a pair of front locating holes and a pair of rear locating holes;
   two arched vertical side frames respectively pivoted to said side bars of said bottom frame, said arched vertical side frames each having a lug respectively fixedly provided at a top side, the lugs at said arched vertical side frames each having a locating groove;
   a transverse top bar, said transverse top bar having two springy hooks respectively provided at two ends thereof and respectively detachably fastened to the locating grooves of the lugs at said vertical side frames;
   a trailer bar, said trailer bar having a rear end pivotally connected to said channel shaped lug at one of said side bars of said bottom frame by a pivot and a front end connectable to a bicycle or tricycle, said trailer bar being turned about said pivot between an extended position and a received position; and
   a lock pin selectively inserted into the front or rear locating hole of said channel shaped lug to lock said trailer bar to said bottom frame between said extended and said received position;
   wherein said vertical side frames each are comprised of an arched top frame bar and two bottom frame bars, said arched top frame bar having two distal ends thereof respectively pivotally connected to said bottom frame bars, said bottom frame bars each having a top end respectively pivoted to said arched top frame bar, a bottom end respectively pivoted to said side bars of said bottom frame, and a stop plate fixedly provided at the respective top end for stopping the associating arched top frame bar to limit the turning angle of the associating arched frame bar relative to the respective bottom frame bar;
   said front bar and said rear bar of said bottom frame each comprised of two sleeves respectively perpendicularly affixed to said side bars of said bottom frame, a connecting tube, said connecting tube having two distal ends respectively inserted into said sleeves, and two locking devices adapted to lock the two distal ends of said connecting tube to said sleeves.

2. The frame structure for foldable baby trailer as claimed in claim 1, wherein said locking devices each are comprised of a screw respectively inserted through respectively locating holes on said sleeves and respectively locating holes on said connecting tube, a nut threaded onto the screw of the respective locking device, and a washer mounted on the screw of the respective locking device and stopped between the associating sleeve and the nut of the respective locking device.

3. The frame structure for foldable baby trailer as claimed in claim 1, wherein said locking devices each are comprised of a spring retainer respectively mounted inside said connecting tube and engageable into respective locating holes on the associating sleeve.

4. The frame structure for foldable baby trailer as claimed in claim 1, further comprising at least one bumper detachably connected between said side bars of said bottom frame, said at least one bumper each having two springy hooks respectively hooked in a respective retaining hole on a respective locating block at each of said side bars of said bottom frame.

* * * * *